(12) United States Patent
Williams et al.

(10) Patent No.: US 8,833,504 B2
(45) Date of Patent: Sep. 16, 2014

(54) STEERING APPARATUS

(75) Inventors: Daniel E. Williams, Lebanon, IN (US);
Kenneth A. Sherwin, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 799 days.

(21) Appl. No.: 12/511,103

(22) Filed: Jul. 29, 2009

(65) Prior Publication Data
US 2009/0292421 A1 Nov. 26, 2009

Related U.S. Application Data

(63) Continuation-in-part of application No. 11/293,429, filed on Dec. 2, 2005, now Pat. No. 7,575,089.

(51) Int. Cl.
*B62D 7/15* (2006.01)
*B62D 5/04* (2006.01)
*B60T 8/1755* (2006.01)
*B62D 7/14* (2006.01)

(52) U.S. Cl.
CPC *B62D 7/144* (2013.01); *B62D 5/04* (2013.01); *B62D 7/159* (2013.01); *B60T 8/1755* (2013.01); *B60T 2260/022* (2013.01); *B62D 7/1581* (2013.01); *B62D 5/0484* (2013.01)
USPC ............ 180/408; 180/410; 180/412; 180/414

(58) Field of Classification Search
USPC .................. 180/410, 412, 413, 414, 415, 408
See application file for complete search history.

(56) References Cited

U.S. PATENT DOCUMENTS

| | | | | |
|---|---|---|---|---|
| 3,323,610 A | * | 6/1967 | Kress et al. ................. | 180/24.01 |
| 4,767,588 A | * | 8/1988 | Ito .................................. | 701/41 |
| 4,782,907 A | | 11/1988 | Morishita et al. | |
| 4,811,805 A | * | 3/1989 | Yoshida et al. ............... | 180/414 |
| 5,014,801 A | | 5/1991 | Hirose | |
| 5,060,743 A | * | 10/1991 | Oda et al. ....................... | 180/415 |
| 5,143,400 A | * | 9/1992 | Miller et al. ................ | 280/5.522 |
| 5,709,281 A | | 1/1998 | Sherwin et al. | |
| 5,899,292 A | * | 5/1999 | Paul et al. ..................... | 180/419 |
| 5,996,722 A | * | 12/1999 | Price ............................. | 180/403 |

(Continued)

FOREIGN PATENT DOCUMENTS

| | | |
|---|---|---|
| DE | 3903834 | 8/1989 |
| DE | 4224887 | 9/1993 |

(Continued)

*Primary Examiner* — Kevin Hurley
*Assistant Examiner* — Michael Stabley
(74) *Attorney, Agent, or Firm* — Tarolli, Sundheim, Covell & Tummino LLP

(57) ABSTRACT

An apparatus for use in turning steerable vehicle wheels upon manual rotation of a hand wheel includes a torque sensor connected with a torque sensor and a rear steering gear. The controller selectively controls the rear steering gear in response to an output from the torque sensor upon manual application of at least a predetermined torque to the hand wheel. The controller selectively controls the rear steering gear in response to the output from the torque sensor through a first range of turning movement of the front wheels so that the steering angle of the rear wheels has a first relationship to the steering angle of the front wheels and through a second range of turning movement of the front wheels so that the steering angle of the rear wheels has a second relationship different from the first relationship.

16 Claims, 6 Drawing Sheets

(56) References Cited

U.S. PATENT DOCUMENTS

| | | | |
|---|---|---|---|
| 6,059,056 A * | 5/2000 | Becker | 180/24.01 |
| 6,341,251 B1 | 1/2002 | Enomoto et al. | |
| 6,366,842 B1 * | 4/2002 | Kaji et al. | 701/41 |
| 6,546,322 B2 | 4/2003 | Williams | |
| 6,735,510 B2 | 5/2004 | Hac | |
| 6,856,877 B2 | 2/2005 | Coelingh et al. | |
| 7,575,089 B2 | 8/2009 | Sherwin | |
| 7,810,608 B2 * | 10/2010 | Goto et al. | 180/446 |
| 7,975,800 B2 * | 7/2011 | Hummel et al. | 180/445 |
| 2002/0030407 A1 | 3/2002 | Nishizaki et al. | |
| 2003/0028301 A1 * | 2/2003 | Sebastian et al. | 701/41 |
| 2005/0236896 A1 | 10/2005 | Offerie et al. | |
| 2006/0042860 A1 * | 3/2006 | Endo et al. | 180/412 |
| 2007/0169969 A1 * | 7/2007 | Hummel et al. | 180/24.01 |

FOREIGN PATENT DOCUMENTS

| | | |
|---|---|---|
| DE | 10029819 | 5/2002 |
| DE | 10 2007 048 027 | 5/2008 |
| DE | 10 2007 048 802 | 4/2009 |

* cited by examiner

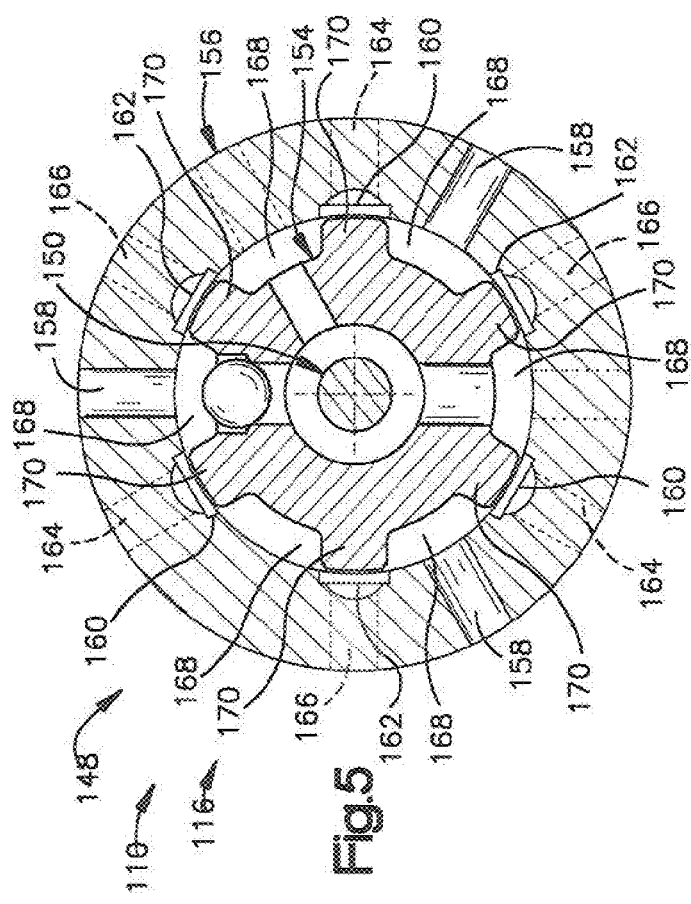
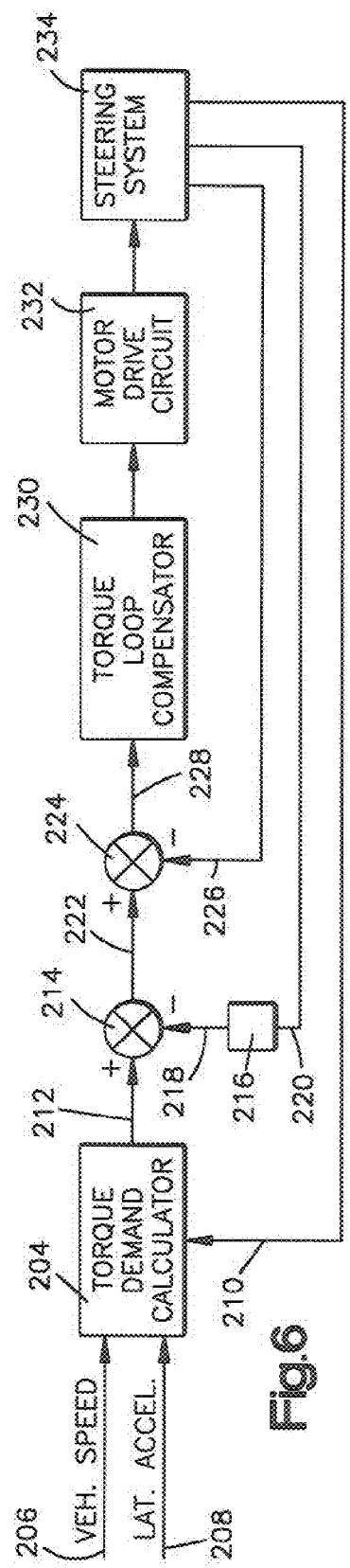

STEERING APPARATUS

CROSS-REFERENCE TO RELATED APPLICATION

This application is a continuation in part of U.S. patent application Ser. No. 11/293,429 filed on Dec. 2, 2005, now U.S. Pat. No. 7,575,089 and entitled, "STEERING APPARATUS", which is incorporated herein by reference.

BACKGROUND OF THE INVENTION

The present invention relates to a vehicle steering apparatus.

A known vehicle steering apparatus includes a front steering gear which is connected with steerable front wheels of a vehicle. In addition, two rear steering gears are connected with steerable rear wheels of the vehicle. A position sensor determines the steering position of steerable front wheels of the vehicle. A controller is provided to control operation of the two rear steering gears and turning of the steerable rear wheels of the vehicle.

It is possible to oversteer the rear steerable wheels with respect to the front steerable wheels during the steering of the front steerable wheels and undesirably decrease the turning radius of the vehicle. This can also result in the sliding of the tire at an angle to the direction that it is pointing, which is known as tire scrub. If excessively large, the tire scrub can cause extensive wear to the tires resulting in poor traction and/or damage to the tire.

SUMMARY OF THE INVENTION

The present invention relates to an apparatus for use in turning steerable vehicle wheels upon manual rotation of a hand wheel. The apparatus includes a front steering gear connected with steerable front wheels of the vehicle. The front steering gear is operable to turn the steerable front wheels of the vehicle upon manual rotation of the hand wheel. A rear steering gear is connected with steerable rear wheels of the vehicle. A torque sensor is connected with the steering wheel. A controller is connected with the torque sensor and rear steering gear. The controller is operable to effect operation of the rear steering gear in response to an output from the torque sensor upon manual application of at least a predetermined torque to the steering wheel. The torque sensor has an output which corresponds to a torque which is less than the predetermined torque throughout turning of the steerable front wheels through a first range of turning movement. The torque sensor has an output which corresponds to a torque which is at least as great as the predetermined torque which occurs when turning of the steerable front wheels during a second range of turning movement of the front steerable wheels. The controller is operable to effect operation of the rear steering gear in response to the output from the torque sensor through the first range of turning movement of the front steerable wheels so that the steering angle of the rear steerable wheels has a first relationship to the steering angle of the front steerable wheels. The controller is operable to effect operation of the rear steering gear in response to the output from the torque sensor through the second range of turning movement of the front steerable wheels so that the steering angle of the rear steerable wheels has a second relationship to the steering angle of the front steerable wheels different from the first relationship.

In another aspect of the present invention an apparatus for use in turning steerable wheels of a vehicle upon manual rotation of a hand wheel includes a front steering gear connected with front steerable wheels of the vehicle. The front steering gear is operable to turn the front steerable wheels of the vehicle upon manual rotation of the hand wheel. A rear steering gear connected with rear steerable wheels of the vehicle is operable to turn the rear steerable wheels upon manual rotation of the hand wheel. A sensor senses a parameter related to the steering of said front steerable wheels. A controller is operatively connected with the sensor and the rear steering gear. The controller is operable in response to the sensed parameter to effect operation of the rear steering gear to maintain a predetermined kinematic relationship between the front steerable wheels and the rear steerable wheels throughout a first range of turning movement of the front steerable wheels.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is a view along line 5-5 of FIG. 3;

FIG. 6 is a process diagram of a control process for the apparatus of FIG. 2.

DESCRIPTION OF THE PREFERRED EMBODIMENTS

Figure 1:
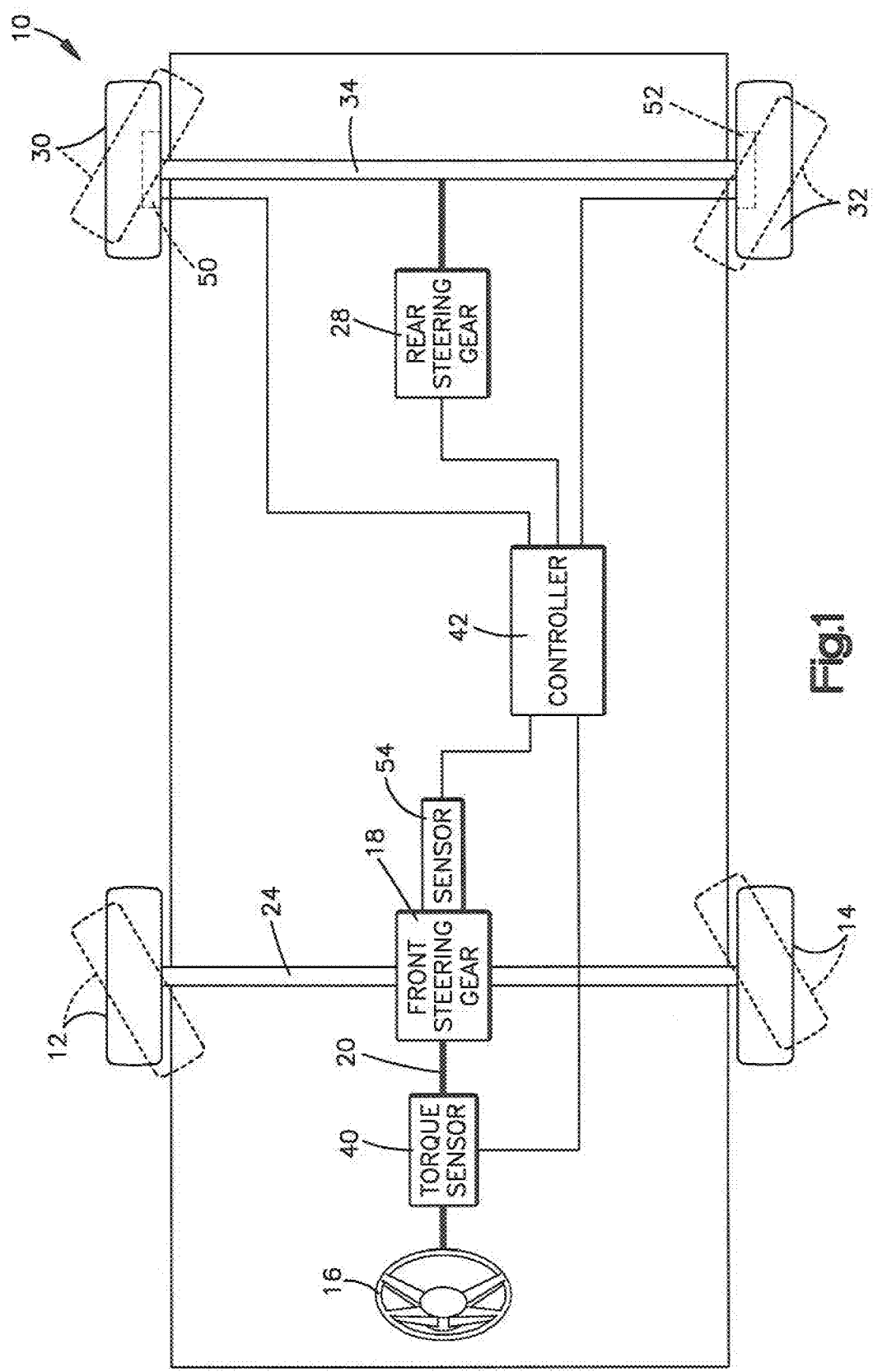
FIG. 1 is a schematic block diagram illustrating a first exemplary embodiment of a steering apparatus constructed in accordance with the present invention.

A first exemplary embodiment of the present invention is illustrated in FIG. 1. A vehicle 10 (FIG. 1) has steerable front wheels 12 and 14. A steering or hand wheel 16 is connected with a front steering gear 18 by a steering column 20. The front steering gear 18 is connected with the steerable front wheels 12 and 14 by a front steering linkage 24. Upon manual rotation of the steering wheel 16, the front steering gear 18 actuates the front steering linkage 24 to turn the steerable front wheels 12 and 14 of the vehicle 10 in a known manner.

The front steering gear 18 is of the power rack and pinion type. However, the front steering gear 18 may have any other known type of construction. For example, the front steering gear 18 may be of the well known integral type.

A rear steering gear 28 is connected with steerable rear wheels 30 and 32 by a rear steering linkage 34. Operation of the rear steering gear 28 is effective to turn the steerable rear wheels 30 and 32 to decrease the turning radius of the vehicle. The rear steering gear 28 is of the power rack and pinion type. However, the rear steering gear may have any other known type of construction.

If the vehicle 10 is to be turned toward the left (as viewed in FIG. 1), the hand wheel 16 is rotated in a counterclockwise direction by manual application of force to the steering wheel. Rotation of the steering wheel 16 is transmitted through the steering column 20 to the front steering gear 18. The front steering gear 18 actuates the front steering linkage 24 to turn the steerable front wheels 12 and 14 through a first range of turning movement from the straight ahead positions shown in solid lines in FIG. 1 toward the end of turning range positions shown in dashed lines in FIG. 1.

In order to further decrease the turning radius of the vehicle 10, the rear steering gear 28 may be operated to turn the steerable rear wheels 30 and 32 from the straight ahead positions illustrated in solid lines in FIG. 1 toward the end of turning range positions illustrated in dashed lines in FIG. 1. A torque sensor 40 is connected with the steering wheel 16 and with a controller 42. The controller 42 is in turn connected with the rear steering gear 28.

When the output from the torque sensor 40 corresponds to the manual application of at least a predetermined force to the steering wheel 16, the controller 42 is operable to effect operation of the rear steering gear 28. Operation of the rear steering gear 28 operates the rear steering linkage 34 to turn the steerable rear wheels 30 and 32.

During manual rotation of the steering wheel 16 and turning movement of the steerable front wheels 12 and 14, the output from the torque sensor 40 does not effect operation of the controller 42 and rear steering gear 28 to turn the steerable rear wheels 30 and 32 of the vehicle 10. However, when the steerable front wheels 12 and 14 of the vehicle 10 have been turned through the first range of turning movement to the ends of their ranges of turning movement, illustrated in dashed lines in FIG. 1, in response to rotation of the steering wheel 16, the driver of the vehicle will increase the force which is manually applied to the steering wheel. This results in a change in the output from the torque sensor 40 to the controller 42 to attempt to further turn the front wheels 12 and 14 through a second range of turning movement.

In response to the change in the output transmitted from the torque sensor 40 to the controller 42, the controller initiates operation of the rear steering gear 28 to turn the steerable rear wheels 30 and 32 to further decrease the turning radius of the vehicle 10. The controller 42 effects operation of the rear steering gear 28 and rear steering linkage 34 to turn the steerable rear wheels 30 and 32 in a direction which is opposite to the direction in which the steerable front wheels 12 and 14 were turned before they reached their ends of steering range positions.

The steerable rear wheels 30 and 32 are turned when the steerable front wheels 12 and 14 are at the ends of their ranges of turning movement. This results in a sequential turning of first the steerable front wheels 12 and 14 and then the steerable rear wheels 30 and 32. Therefore, the controller 42 effects operation of the rear steering gear 28 to turn the steerable rear wheels 30 and 32 while the front steering gear 18 is ineffective to turn the steerable front wheels 12 and 14 through the second range of turning movement from their end of steering range positions illustrated in dashed lines in FIG. 1. This results in the turning radius of each of the steerable front wheels 12 and 14 remaining constant while the turning radius of each of the steerable rear wheels 30 and 32 changes.

The output from the torque sensor 40 to the controller 42 varies as a function of variations in the force which is manually applied to the steering wheel 16. During normal rotation of the steering wheel 16 to operate the front steering gear 18 and turn the steerable front wheels 12 and 14, the relatively small force which is manually applied to the steering wheel 16 results in an output signal from the torque sensor 40 which does not cause the controller 42 to initiate operation of the rear steering gear 28.

When the steerable front wheels 12 and 14 reach the ends of their ranges of turning movement, the force which is manually applied to the steering wheel 16 increases to at least a predetermined force. Application of the predetermined force to the steering wheel 16 results in an increase in the output signal transmitted from the torque sensor 40 to the controller 42. In response to the increase in the signal transmitted from the torque sensor 40 to the controller 42, corresponding to at least the predetermined force, the controller initiates operation of the rear steering gear 28 to turn the steerable rear wheels 30 and 32.

In addition to initiating operation of the rear steering gear 28, the controller 42 may also effect operation of a rear wheel brake 50 or 52. In the illustrated embodiment of the invention, the controller 42 effects operation of only the rear wheel brake 50 or 52 which is disposed on a radially inner side of a turn after the rear wheels 30 and 32 have been moved to their end of steering range positions. When the steerable front wheels 12 and 14 and steerable rear wheels 30 and 32 have been turned to their end of steering range positions, shown in dashed lines in FIG. 1, the rear wheel brake 52 which is closest to the center of a curve on which the vehicle 10 is traveling is actuated.

A turning direction sensor 54 is connected with the front steering gear 18 and has an output which is transmitted to the controller 42. The output from the turning direction sensor 54 indicates the direction in which the front wheels 12 and 14 have moved from their straight ahead positions (shown in solid lines in FIG. 1) toward their end of steering range positions (shown in dashed lines in FIG. 1). In response to a predetermined output from the torque sensor 40 and the output from the steering direction sensor 54, the controller 42 actuates the rear wheel brake 52 for the steerable rear wheel 32 while the rear wheel brake 50 for the steerable rear wheel 30 remains in an unactuated condition.

Actuation of the rear wheel brake 52 for the steerable rear wheel 32 results in friction forces between the steerable rear wheel 32 and the road along which the vehicle is traveling tending to turn the vehicle to the inside of the curve along which the vehicle is traveling with a resulting reduction in turning radius. Of course, if the vehicle 10 was turning toward the right, rather than the left, the controller 42 would actuate the rear wheel brake 50 associated with the steerable rear wheel 30 while the rear wheel brake 52 associated with the steerable rear wheel 32 would remain in an unactuated condition.

In the embodiment illustrated in FIG. 1, the turning direction sensor 54 is connected with the front steering gear 18. However, it is contemplated that the turning direction sensor 54 may be connected with one of the front wheels 12 or 14. Alternatively, the steering direction sensor 54 may be connected with the rear steering gear 28 or one of the steerable rear wheels 30 or 32.

Although it may be desired to have the rear brake 50 or 52 on the radially inner side of a turn actuated along with the rear steering gear 28, these two features may be used separately. For example, the rear steering gear 28 may be actuated to the end of the range of turning movement without actuating either one of the rear brakes 50 or 52. Alternatively, the rear steering gear 28 may be omitted and the rear brake 50 or 52 on the radially inner side of a turn may be actuated after the steerable front wheels 12 and 14 have reached the end of their range of turning movement. As another alternative, the rear brake 50 or 52 on the radially inner side of a turn may be actuated before the rear steering gear 28 has moved the steerable rear wheels 30 and 32 to the ends of their ranges of turning movement.

Actuation of the rear brake 50 or 52 on the inside of the turn may be in response to an increase in the output signal from the torque sensor 40 or in response to a rear wheel position sensor sensing turning movement of the steerable rear wheels 30 and 32 to predetermined positions in their range of turning movement. The predetermined positions of the steerable rear wheels 30 and 32 at which the controller 42 initiates actuation of a rear brake 50 or 52 may be when the steerable rear wheels have been turned to intermediate positions in their range of turning movement or have been moved to positions at the ends of their ranges of turning movement.

It should be understood that the rear steering gear 28 may be used either with or without the feature of actuating one of the rear wheel brakes 50 or 52 on the inside of a turn. It should also be understood that the feature of actuating one of the rear wheel brakes 50 or 52 on the inside of a turn may be utilized without the rear steering gear 28. When the feature of actuating the rear wheel brake 50 or 52 on the radially inner side of a turn is utilized in association with the rear steering gear 28, it is believed that it may be desirable to have the controller 42 respond to a first signal from the torque sensor 40 to initiate operation of the rear steering gear 28 in response to the manual application of a first force to the steering wheel 16. Upon manual application of a second, even larger force to the steering wheel 16, a resulting increase in the signal from the torque sensor 40 to the controller 42 would cause the controller 42 to actuate the rear wheel brake 50 or 52 on the inside of the turn.

In the unlikely event of a failure of the front steering gear 18, the resulting increase in the force which is manually applied to the steering wheel 16 results in an increase in the output signal from the torque sensor 40. The increase in the output signal from the torque sensor 40 causes the controller 42 to initiate operation of the rear steering gear 28 even though the front steerable wheels 12 and 14 are not at the ends of their ranges of turning movement. Operation of the rear steering gear 28 actuates the rear steering linkage 34 to turn the steerable rear wheels 30 and 32. Turning of the steerable rear wheels 30 and 32 decreases the turning radius of the vehicle 10 even though the front steering gear 18 is ineffective to turn the steerable front wheels 12 and 14 in the normal manner.

Upon a malfunction of the front steering gear 18, the force which is manually applied to the steering wheel 16 may be effective to manually drive the front steering gear 18 and cause the front steerable vehicle wheels 12 and 14 to turn. By having the controller 42 activate the rear steering gear 28, the steerable rear wheels 30 and 32 are also turned to decrease the turning radius of the vehicle 10. Therefore, even though the front steering gear 18 is malfunctioning, the driver of the vehicle 10 can, with application of a greater than normal manual force to the steering wheel 16, steer the vehicle 10.

It should be understood that if the rear steering gear 28 is omitted, the feature having the radially inner one of the rear wheel brakes 50 or 52 actuated to induce turning movement of the vehicle 10 may be utilized in the unlikely event of a malfunctioning of the front steering gear 18. Alternatively, the controller 40 may effect operation of the rear steering gear 28 to turn the steerable rear wheels 30 and 32 upon movement of the steerable front wheels 12 and 14 to their end of steering range positions and the resulting manual application of a first force to the steering wheel which is larger than the force which is normally applied to the steering wheel during normal turning of the steerable front wheels 12 and 14. In the event that a second force, which is even larger than the first force, is manually applied to the steering wheel, the controller 42 may actuate the rear wheel brake 50 or 52 on the inside of the turn in addition to actuating the rear steering gear 28.

If an operator of a vehicle turns the steerable front wheels 12 and 14 to their end of steering range positions and then applies the first force to the steering wheel 16, the output from the torque sensor 40 would initiate operation of the controller 42 to operate the rear steering gear 28 to turn the steerable rear wheels. This may be done without actuation of the radially inner rear wheel brake 50 or 52 by the controller 42. If the even larger second force is manually applied to the steering wheel 16, the output signal from the torque sensor 40 may cause the controller 42 to actuate rear wheel brake 50 or 52 on the inside of the turn. The relatively large second force would be applied to the steering wheel 16 after the steerable front vehicle wheels 12 and 14 have been turned to their end of steering range positions or upon failure of the front steering gear 18.

In a second exemplary embodiment (FIGS. 2 and 3), a vehicle 110 has steerable front wheels 112 and 113. A steering or hand wheel 114 is connected with a front steering gear 116 by a steering column 115. The front steering gear 116 is connected with the steerable front wheels 112 and 113 by a front steering linkage 121. The right front steerable wheel 112 rolls on the traveling surface about a rolling axis 117 extending through its hub. The left front steerable wheel 113 rolls on the traveling surface about a rolling axis 119 extending through its hub. Upon manual rotation of the hand wheel 114, the front steering gear 116 actuates the front steering linkage 121 to turn the front steerable wheels 112 and 113 of the vehicle 110 in a known manner.

The front steering gear 116 may be of an integral type. However, the front steering gear 116 may have any other known type of construction. For example, the front steering gear 116 may be of the power rack and pinion type.

A rear steering gear 238 is connected with steerable rear wheels 240 and 242 by a rear steering linkage 215. The right rear steerable wheel 240 rolls on the traveling surface about a roiling axis 243 extending through its hub. The left rear steerable wheel 242 rolls on the traveling surface about a rolling axis 246 extending through its hub. Operation of the rear steering gear 238 is effective to turn the rear steerable wheels 240 and 242. The rear steering gear 238 may be of the power rack and pinion type. However, the rear steering gear 238 may have any other known type of construction.

The vehicle has an axle 248 with a pair of middle wheels 254 and 256 mounted on opposite ends of the axle 248. The middle wheels 254 and 256 roll on the traveling surface about a common rolling axis 258 extending through their hubs. The middle wheels 154 and 156 are not steerable.

Figure 4:
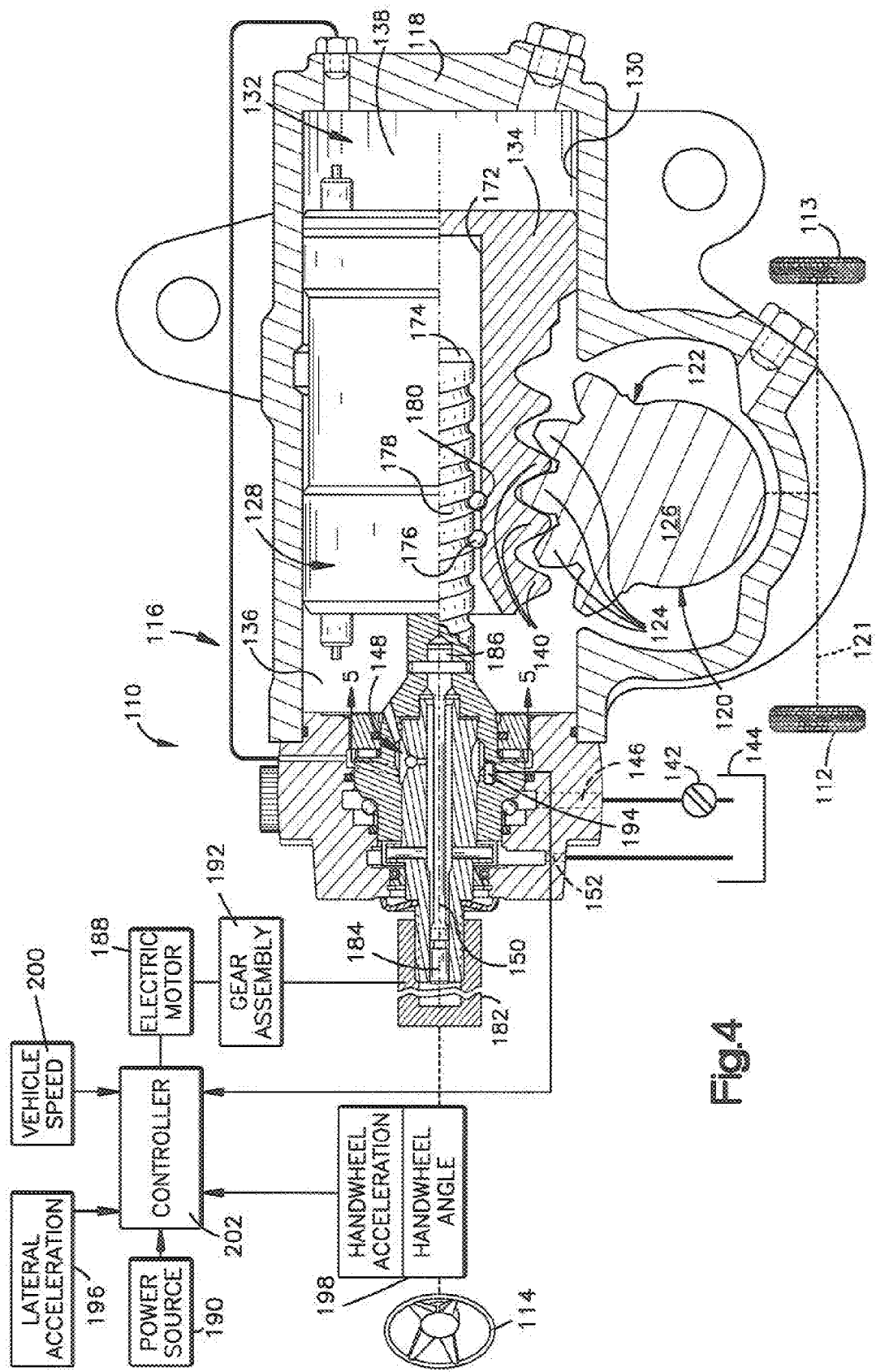
FIG. 4 is a schematic illustration of a portion of the steering apparatus of FIG. 2.

FIG. 4 depicts a hydraulic powered steering gear 116 of the integral type for the front steerable wheels 112 and 113. The front steering gear 116 includes a housing 118 and a drive mechanism 120. The drive mechanism 120 moves in response to rotation of the hand wheel 114 of the vehicle. The motion of the drive mechanism 120 results in a turning of the front steerable wheels 112 and 113 of the vehicle.

The drive mechanism 120 includes a sector gear 122 having a plurality of teeth 124. The sector gear 122 is fixed on an output shaft 126 that extends outwardly through an opening in the housing 118. The output shaft 126 is typically connected to a pitman arm that is connected to the steering linkage of the vehicle. The dashed lines in FIG. 4 represent the pitman arm and steering linkage 121. Thus, as the sector gear 122 rotates, the output shaft 126 is rotated to operate the steering linkage 121. As a result, the front steerable wheels 112, 113 of the vehicle are turned.

The steering gear 116 further includes a hydraulic motor 128 for moving the drive mechanism 120. The hydraulic motor 128 is located within the housing 118 of the steering gear 116. The housing 118 of the steering gear 116 has an inner cylindrical surface 130 defining a chamber 132. A piston 134 is located within the chamber 132 and divides the chamber 132 into opposite chamber portions 136 and 138. One chamber portion 136 is located on a first side of the piston 134 and the other chamber portion 138 is located on a second side of the piston 134. The piston 134 creates a seal between the respective chamber portions 136 and 138 and is capable of axial movement within the chamber 132. This axial movement of the piston 134 results in an increase in volume of one chamber portion 136 or 138 and a corresponding decrease in volume of the other chamber portion 136 or 138.

A series of rack teeth 140 is formed on the periphery of the piston 134. The rack teeth 140 act as an output for the hydraulic motor 128 and mesh with the teeth 124 formed on the sector gear 122 of the drive mechanism 120.

A pump 142 pumps hydraulic fluid from a reservoir 144 to the hydraulic motor 128. The engine of the vehicle drives the pump 142. However, the pump 142 could be driven otherwise, such as by an electric motor. The pump 142 forces hydraulic fluid into an inlet 146 of the housing 118. The inlet 146 directs the flow of the fluid to a directional control valve 148.

The directional control valve 148 directs the fluid to an appropriate chamber portion 136 or 138 of the hydraulic motor 128. The flow of hydraulic fluid toward one of the chamber portions 136 or 138 increases the pressure within that chamber portion 136 or 138. When the pressure of one chamber portion 136 or 138 increases relative to the pressure of the other chamber portion 136 or 138, the piston 134 moves axially and the volume of the higher-pressure chamber portion 136 or 138 increases. The volume of the higher-pressure chamber portion 136 or 138 increases until the pressure within each chamber portion 136 and 138 equalizes. As the volume of one chamber portion 136 or 138 increases, the volume of the other chamber portion 136 or 138 decreases. The decreasing chamber portion 136 or 138 is vented to allow a portion of the fluid contained in the decreasing chamber portion 136 or 138 to escape. The escaping fluid exits the housing 118 via a return 152 and is directed into the reservoir 144.

An embodiment of the directional control valve 148 is shown in FIG. 5. The directional control valve 148 contains a valve core part 154 and a valve sleeve part 156. A portion of the valve core part 154 is contained within and is rotatable relative to the valve sleeve part 156.

The valve sleeve part 156 includes three radially directed passages 158 that extend from an outer circumference of the valve sleeve part 156 to an inner circumference of the valve sleeve part 156. Each of these radial passages 158 is supplied with hydraulic fluid that enters the housing 118 through the inlet 146. Two axially extending grooves 160 and 162 are associated with each radial passage 158. The axially extending grooves 160 and 162 are located on the inner circumference of the valve sleeve part 156. As shown in FIG. 5, one groove 162 is located clockwise from and one groove 160 is located counter-clockwise from each radial passage 158. The grooves 160 and 162 are spaced an equal distance from the respective radial passage 158. Each groove 160 leads to a passage 164 extending radially outwardly through the valve sleeve part 156. Each groove 162 leads to a passage 166 extending radially outwardly through the valve sleeve part 156. Each groove 160 and 162 and associated passage 164 and 166 is associated with a particular chamber portion 136 and 138 of the hydraulic motor 128. For example, with reference to FIG. 5, each groove 162 and associated passage 166 located immediately clockwise of a radial passage 158 will supply hydraulic fluid to chamber portion 136; whereas, each groove 160 and associated passage 164 located immediately counter-clockwise from a radial passage 158 will supply hydraulic fluid to chamber portion 138.

Six grooves 168 are located around the outer circumference of the valve core part 154. The valve core part 154 also includes six protrusions 170. A protrusion 170 separates adjacent grooves 168 on the outer circumference of the valve core part 154. Side walls of the protrusion 170 form side walls of the grooves 168.

When the valve core part 154 is located relative to the valve sleeve part 156 such that each protrusion 170 of the valve core part 154 is centered relative to a respective passage 164 and 166 of the valve sleeve part 156, the directional control valve 148 is in a neutral position. FIG. 5 illustrates the directional control valve 148 in the neutral position. In this neutral position, the pressure within each chamber portion 136 and 138 of the hydraulic motor 128 is the same so that the piston 134 is stationary. When the valve core part 154 is rotated relative to the valve sleeve part 156, access to one of the two associated grooves 160 and 162 of the valve sleeve part 156 is restricted by a protrusion 170, while access to the other of the two associated grooves 160 and 162 is increased. This allows a greater amount of the hydraulic fluid to flow into the open groove 160 and 162, resulting in a pressurizing of the respective chamber portion 136 or 138 associated with that groove 160 or 162. As a result, the piston 134 of the hydraulic motor 128 is moved causing an increase in the volume of the respective chamber portion 136 or 138. For example, if the valve core part 154 is rotated clockwise, the groove 160 of the valve sleeve part 156 located on the counter-clockwise side of the radial passage 158 becomes blocked and the groove 162 located on the clockwise side of the radial passage 158 becomes open. Thus, a greater amount of the hydraulic fluid flows into the open groove 162 and travels to the chamber portion 136 of the hydraulic motor 128 associated with the open groove 162. The increased hydraulic fluid flowing to chamber portion 136 increases the pressure within chamber portion 136 and forces the piston 134 to move in an axial direction to increase the volume of chamber portion 136. As a result, the piston 134 rotates the sector gear 122 and the steerable wheels 112 are turned in the appropriate direction.

The piston 134 of the hydraulic motor 128 contains a bore 172, partially shown in FIG. 4, which is open toward the directional control valve 148. The valve sleeve part 156 and a follow-up member 174 form an integral one-piece unit that is supported for rotation relative to the piston 134 by a plurality of balls 176. The outer periphery 178 of the follow-up member 174 is threaded. The plurality of balls 176 interconnects the threaded outer periphery 178 of the follow-up member 174 with an internal thread 180 formed in the bore 172 of the piston 134. As a result of the interconnecting plurality of balls 176, axial movement of the piston 134 causes the follow-up member 174 and the valve sleeve part 156 to rotate. The rotation of the follow-up member 174 and the valve sleeve part 156 returns the directional control valve 148 to the neutral position.

The valve core part 154 of the directional control valve 148 is fixedly connected to an input shaft 182 (FIG. 4) of the column 115. As shown schematically by dashed lines in FIG. 4, the input shaft 182 is fixedly connected to the hand wheel 114 of the vehicle. Rotation of the hand wheel 114 results in rotation of the input shaft 182 and rotation of the valve core part 154.

The torsion bar 150 has a first end 184 and a second end 186. The first end 184 of the torsion bar 150 is fixed relative to the input shaft 182 and the valve core part 154. The second end 186 of the torsion bar 150 is fixed relative to the valve sleeve part 156 and the follow-up member 174. At least a portion of the torsion bar 150 extends through an axially extending bore 172 in the valve core part 154, as shown in FIGS. 4 and 5.

When the resistance to turning of the steerable wheels 112 and 113 of the vehicle is below a predetermined level, rotation of the hand wheel 114 is transferred through the torsion bar 150 and causes rotation of the follow-up member 174. As a result, the directional control valve 148 remains in the neutral position. Rotation of the follow-up member 174 causes movement of the piston 134 and results in turning of the steerable wheels 112 and 113. When resistance to turning the steerable wheels 112 and 113 of the vehicle is at or above the predetermined level, rotation of the follow-up member 174 is resisted. As a result, rotation of the hand wheel 114 rotates the first end 184 of the torsion bar 150 relative to the second end 186 of the torsion bar 150. The rotation of the first end 184 of the torsion bar 150 relative to the second end 186 of the torsion bar 150 applies a torque across the torsion bar 150 and causes the valve core part 154 to rotate relative to the valve sleeve part 156.

As discussed above, when the valve core part 154 rotates relative to the valve sleeve part 156, hydraulic fluid is directed toward one of the chamber portions 136 or 138. As a result, the piston 134 moves within the chamber 132. Movement of the piston 134 results in turning of the steerable wheels 112 and 113 of the vehicle, as well as, rotation of the follow-up member 174. As discussed above, rotation of the follow-up member 174 rotates the valve sleeve part 156 until the directional control valve 148 is again in the neutral position. When the directional control valve 148 is in the neutral position, the torque across the torsion bar 150 is removed and the first end 184 of the torsion bar 150 is no longer rotated relative to the second end 186 of the torsion bar 150.

The apparatus 110 also includes an electric motor 188. The electric motor 188 may be of any conventional design. The electric motor 188 receives electric power from a power source 190, preferably the vehicle battery. An output shaft (not shown) of the electric motor 188 is connected to the steering column 115 and the input shaft 182. A gear assembly 192 may be used to connect the output shaft of the electric motor 188 to the input shaft 182. When the electric motor 188 receives electric power, the output shaft of the electric motor 188 rotates the steering column 115 and the input shaft 182.

The apparatus 110 also includes a torque sensor 194 for sensing column torque and outputting a signal indicative of the column torque. Column torque is the torque across the torsion bar 150. The torque sensor may measure the rotational movement of the first end 184 of the torsion bar 150 relative to the second end 186 of the torsion bar 150. The movement of the valve core part 154 relative to the valve sleeve part 156 will also indicate the relative rotation between the first end 184 and the second end 186 of the torsion bar 150. The column torque can be determined using the material properties of the torsion bar 150 and the relative rotation across the torsion bar.

As shown in FIG. 4, the apparatus 110 also includes a plurality of vehicle condition sensors 196, 198, and 200 and a controller 202. Preferably, the vehicle condition sensors include a lateral acceleration sensor 196, a hand wheel rotation sensor 198, and a vehicle speed sensor 200. Each sensor 196, 198, and 200 is electrically connected to the controller 202.

The lateral acceleration sensor 196 continuously senses the lateral acceleration of the vehicle and generates an electrical signal indicative of the sensed lateral acceleration. The hand wheel rotation sensor 198 continuously senses the magnitude, rate, and acceleration of rotation of the vehicle hand wheel 114 and generates electrical signals indicative of these parameters. The hand wheel rotation magnitude is the angle of rotation of the hand wheel 114 relative to a straight ahead position of the hand wheel 114. Rotation of the hand wheel 114 in a first direction may be designated as a positive value and rotation of the hand wheel 114 in a second direction, opposite the first direction, may be designated as a negative value. The hand wheel rotation sensor 198, or the controller 202, may determine the rate of rotation of the hand wheel 114 by taking a time differential of the magnitude and may determine the hand wheel acceleration by taking a time differential of the rate of rotation. The vehicle speed sensor 200 continuously senses the vehicle speed and generates an electrical signal indicative of the speed.

The controller 202 receives the signals generated by the lateral acceleration sensor 196, the hand wheel rotation sensor 198, and the vehicle speed sensor 200. Additionally, the controller 202 receives the column torque signal from the torque sensor 194. The controller 202 analyzes the respective signals and generates an error signal for controlling the electric motor 188. FIG. 6 illustrates a control process of the controller 202.

As shown schematically in FIG. 6, a portion of the controller 202, referred to as a torque demand calculator 204, receives the vehicle speed signal 206, the lateral acceleration signal 208, and the hand wheel rotation magnitude signal 210. The torque demand calculator 204 preferably follows an algorithm or a lookup table that is stored in a memory of the controller 202. When the vehicle speed signal 206, the lateral acceleration signal 208, and the hand wheel rotation magnitude signal 210 are received by the controller 202, either the algorithm is run on a processor of the controller 202 or the lookup table is consulted to determine a desired operator torque 212 or force to be applied to the hand wheel 114 of the vehicle. The desired operator torque 212 or force corresponds to the amount of torque or force an operator of the vehicle is to exert on the hand wheel 114 to perform the desired steering maneuver. The desired operator torque 212 is input into a first summation block 214.

Inertia 216 of the hand wheel 114 of the vehicle is determined. One known method of determining the inertia 216 of the hand wheel 114 is by using parallel axis theorems. The inertia 216 of the hand wheel 114 is stored in the memory of the controller 202.

The inertia 216 of the hand wheel 114 is used to calculate a hand wheel torque 218. The hand wheel torque 218 is the torque that the operator of the vehicle must exert on the hand wheel 114 to overcome the inertia 216 of the hand wheel 114. As stated above, the acceleration of the hand wheel is also determined. The hand wheel acceleration signal is indicated at 220 in FIG. 6. To calculate the hand wheel torque 218, the hand wheel acceleration signal 220 is multiplied by the inertia 216 of the hand wheel 114. The hand wheel torque 218 is also input into the first summation block 214.

In the first summation block 214, a value for the hand wheel torque 218 is subtracted from the desired operator torque 212. The output of the first summation block 214, indicated at 222 in FIG. 6, is input into a second summation block 224. The column torque signal 226 from the torque sensor 194 is also input into the second summation block 224. In the second summation block 224, the column torque signal 226 is subtracted from the output 222 of the first summation block 214.

The output of the second summation block 224 is the error signal, indicated at 228. Since both the hand wheel torque 218 and the column torque 226 sensed across the torsion bar 150 are subtracted from the desired operator torque 212 to produce the error signal 228, an equivalent process would be to add the hand wheel torque 218 to the column torque 226 in a first summation block to produce an actual operator torque necessary to perform the steering maneuver. The actual operator torque is then subtracted from the desired operator torque 212 in a second summation block to produce the error signal 228.

The error signal 228 is input into a portion of the controller 202, referred to as a torque loop compensator 230. The torque loop compensator 230 is a lead/lag compensator that receives the error signal 228 and based upon the error signal determines an electrical power output for the electric motor 188. The output of the torque loop compensator 230 is connected to a motor drive circuit 232 of the controller 202. The motor drive circuit 232 regulates the electric power from the power source 190 to the electric motor 188.

The apparatus 110 is illustrated in FIG. 6 as the steering system 234. When the electric motor 188 receives the electric power, the output shaft of the electric motor 188, through the gear assembly 192, applies a force to the input shaft 182 and the steering column 115 to rotate the input shaft 182. As a result, the electric motor 188 assists the operator in controlling the hydraulic motor 128 by adjusting the torque across the torsion bar 150. By using the electric motor 188 to help control the hydraulic motor 128, the apparatus 110 provides a desired steering assist and results in a desired steering feel to the operator.

The control process is repeated continuously during operation of the vehicle. As a result, the error signal 228 is updated continuously to reflect the changes in the vehicle conditions. Thus, the operator applies the desired operator torque or a synthetic torque to turn the hand wheel 114, which torque is the adjusted torque across the torsion bar 150 resulting from implementation of the control process of FIG. 6.

If the vehicle 110 is to be turned toward the left (as viewed in FIG. 2), the hand wheel 114 is rotated in a counterclockwise direction by manual application of force to the hand wheel 114. Rotation of the hand wheel 114 is transmitted through the steering column 115 to the front steering gear 116. The front steering gear 116 actuates the front steering linkage 121 to turn the steerable front wheels 112 and 113 from a straight ahead position toward the end of turning range positions shown in FIG. 2, as previously mentioned.

Rotation of the hand wheel 114 also effects operation of the rear steering gear 238. The controller 202 effects operation of the rear steering gear 238 and rear steering linkage 215 to turn the steerable rear wheels 240 and 242 in a direction which is opposite to the direction in which the steerable front wheels 112 and 113 are turned before they reach their ends of steering range positions.

The controller 202 also effects operation of the rear steering gear 238 to actuate the rear steering linkage 215 to turn the steerable rear wheels 240 and 242 based on a first or kinematic relationship with the front steerable wheels 112 and 113 during a first range of movement of the front steerable wheels. The kinematic relationship is maintained throughout the steering range of the front steerable wheels 112 and 113.

The kinematic relation corresponds to the following equation:

$$RA = K_1 HA + K_2 HT$$

where RA is the angle of the rear steerable wheels, HA is the rotational magnitude of the hand wheel as sensed by the hand wheel rotation sensor 198, and HT is the operator torque applied to the hand wheel 114 to turn the hand wheel 114. The operator torque is desired operator torque or the synthetic torque resulting from implementation of the control process of FIG. 6, as previously mentioned. The constants $K_1$ and $K_2$ are selected so that the angle of the rear steerable wheels 240 and 242 from the straight ahead position is such that throughout the steering range of the front steerable wheels 112 and 113, the rolling axes 117, 119, 243, 246, and 258 of all of the respective wheels 112, 113, 240, 242, 254, and 256 intersect at a common point. Also, this kinematic relationship is such that the difference between the steering angle of the front steerable wheels 112 and 113 and the rear steerable wheels 240 and 242 is at a predetermined value, and this predetermined value remains the same throughout the first turning range of the front steerable wheels 112 and 113. An algorithm based on this equation is run on a processor in the controller 202 to determine the desired angle of the rear steerable wheels 240, 242.

Figure 7:
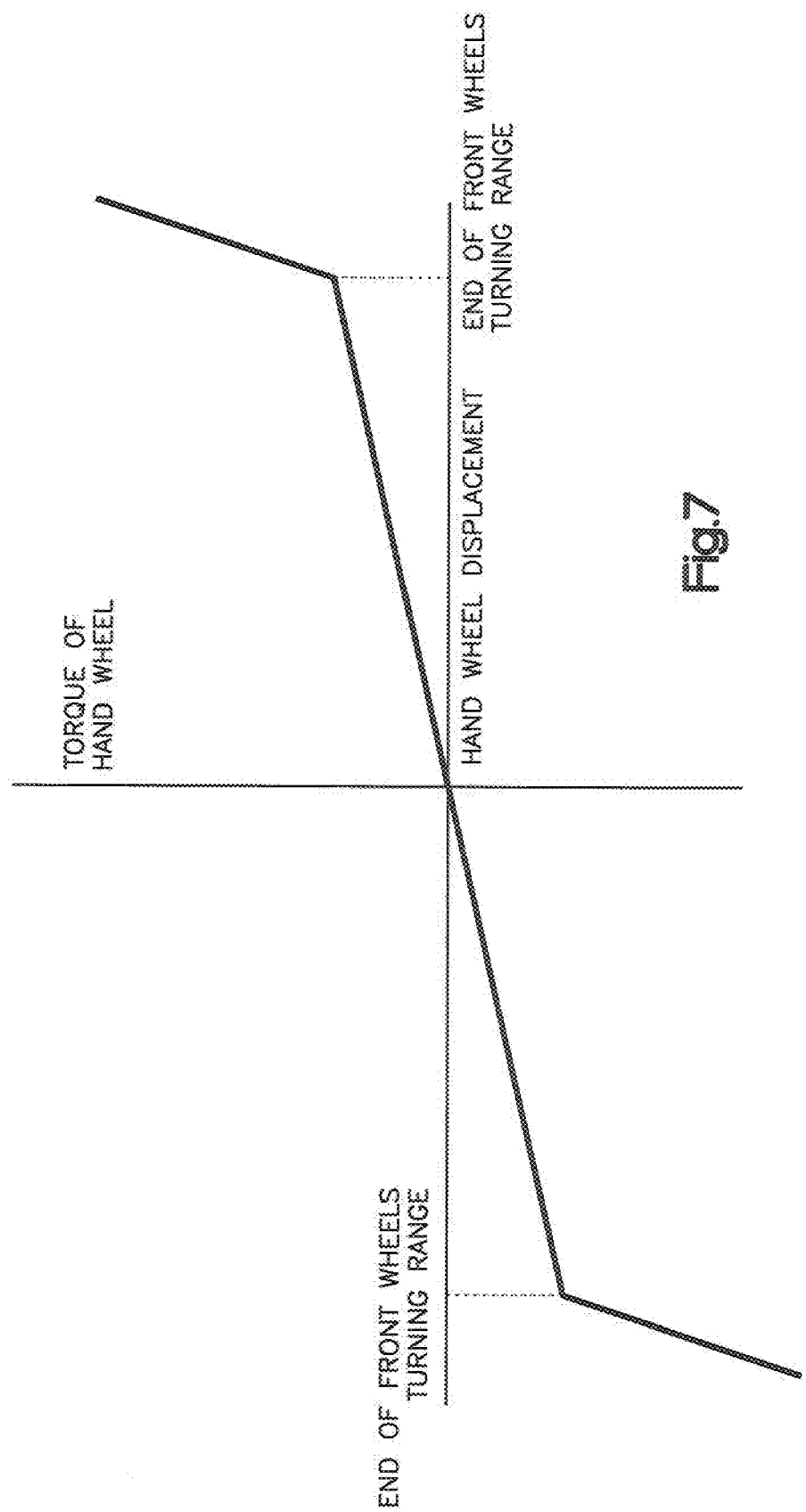
FIG. 7 is a graph depicting the torque needed to turn the hand wheel versus the hand wheel angular displacement for the apparatus of FIG. 2.

Toward the mechanical end of the turning range of the front steerable wheels 112 and 113 or a second range of movement, a sharp increase in the stiffness of the hand wheel 114 is felt by the operator as the front steerable wheels 112 and 113 hit bumpstops before the front steerable wheels hit their mechanical end of turning range or hard stops. The bumpstops are created by the controller 202 when the mechanical end of the turning range of the front steerable wheels 112 and 113 is sensed. The desired operator torque or synthetic torque increases quickly after the front steerable wheels 112 and 113 hit the bumpstops or the end of the first range of turning movement. The graph of FIG. 7 illustrates this condition. In particular, the graph shows a line representing the desired operator torque applied to the hand wheel 114 as a function of the hand wheel angular displacement. The slope of the line is at a constant value during a first turning range of the front steerable wheels 112 and 113. The slope of the line increases during a second turning range of the front steerable wheels 112 and 113 when the hand wheel 114 rotates at a magnitude that approaches the mechanical end of turning range of the front steerable wheels 112 and 113. After the hand wheel 114 reaches this magnitude, the slope of the line significantly increases due to the substantial increase in the desired operator torque applied to the hand wheel 114 provided by the controller 202. The controller causes the motor 188 to substantially resist rotation of the hand wheel 114 during the second range of turning movement when the front steerable wheels 112 and 113 near their mechanical end of turning range. The slope of the line increases until the front steerable wheels 112 and 113 reach the mechanical end of turning range permitted by the geometry of the steering system.

Figure 3:
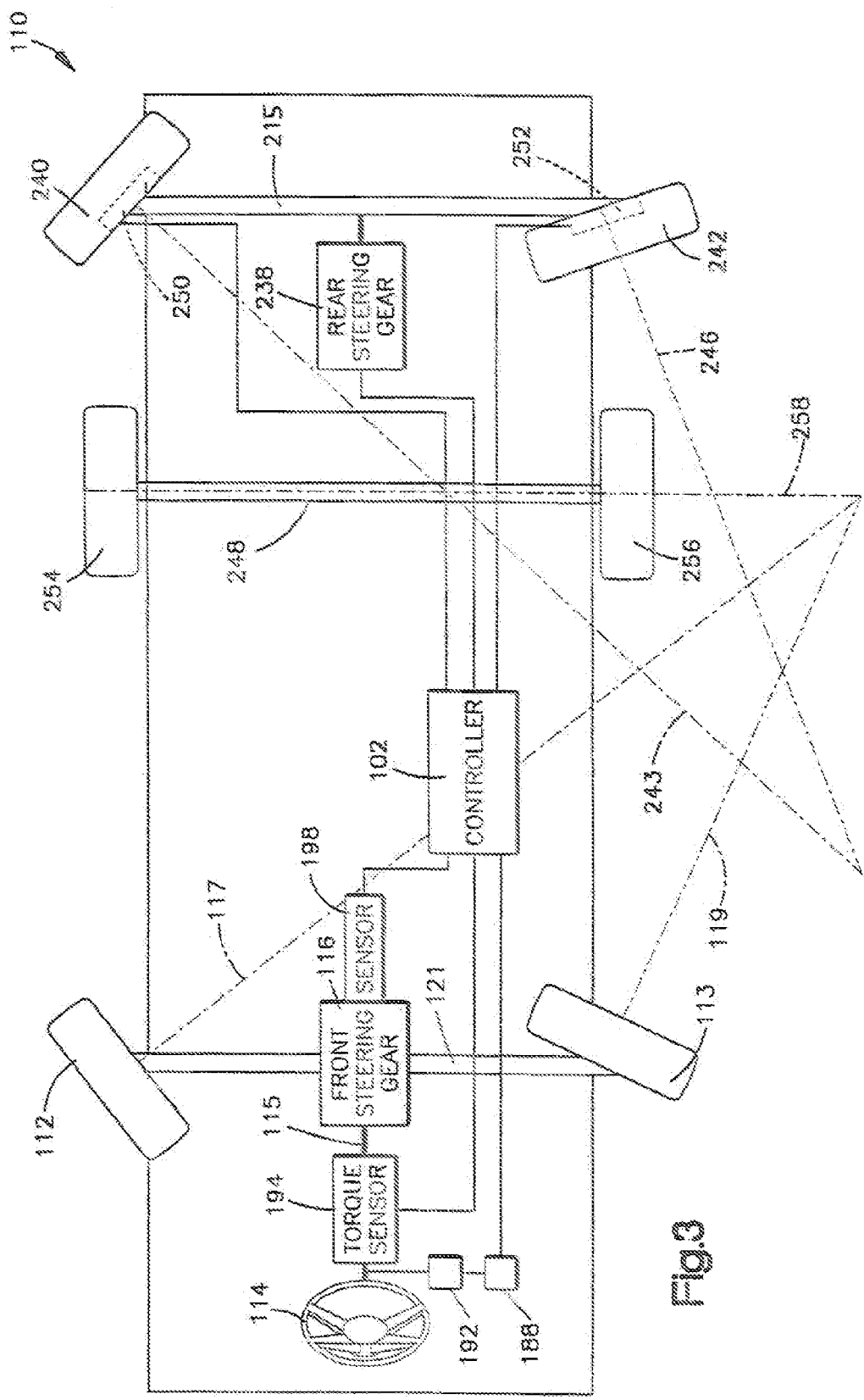
FIG. 3 is a view similar to that of FIG. 2 but showing the rear steerable wheels being turned further than that shown in FIG. 2.

The rear steerable wheels 240 and 242 on the rear steering linkage 215 maintain their proper kinematic relationship to the front steerable wheels 112 and 113 until the front steerable wheels 112 and 113 approach the end of the mechanical turning range. Further motion of the front steerable wheels 112 and 113 is limited at the bumpstops by the increased torque needed by the operator to turn the front steerable wheels. However, the rear steerable wheels 240 and 242 turn further than their kinematic limit as a function of the operator torque applied to the hand wheel 114, as shown in FIG. 3. Accordingly, the rear steerable wheels have a second relationship different than the kinematic relationship during the second range of movement of the front wheels 112 and 113.

The further turning of the rear steerable wheels 240 and 242 is accomplished as follows. A look up table is stored in the memory of the controller 202. The look up table includes values of the desired operator torque of force needed to turn the hand wheel 114 based on the rotational magnitude of the hand wheel 114. Included in this look up table is the value of the operator torque when the rotational magnitude of the hand wheel 114 corresponds to the front steerable wheels 112 and 113 reaching the bumpstops.

Thus, when the rotational magnitude of the hand wheel 114, sensed by the rotation sensor 198, and the desired operator torque determined by the control process of FIG. 6 corresponds to a rotational magnitude of the hand wheel 114 and operator torque stored in the look up table indicative of the front steerable wheels 112 and 113 reaching bumpstops, the controller 202 will output a control signal to the rear steering gear 238 to continue turning the steerable rear wheels 240 and 242 in a direction which is opposite to the direction in which the steerable front wheels 112 and 113 are turned. Thus, the vehicle continues turning in the direction of the turn. With this process, the oversteering begins only when a clear increase in the operator torque is applied.

Alternatively, since the desired operator torque or synthetic torque is based on the rotational magnitude of the hand wheel 114, it is possible to calculate the rear wheel steering angle based only on the front steering angle. However, without using the desired operator torque needed to turn the hand wheel 114, oversteering could be more likely to occur, because of the absence of a noticeable increase in operator torque.

Also, the steering of the front and rear steerable wheels 112, 113, 240, and 242 could be used by a system that senses the rotational magnitude of the hand wheel 114 and operator torque needed to turn the hand wheel 114 directly without the control process of FIG. 6. Yet, the operator torque required to turn the hand wheel 114 will be higher and load dependent. Thus, hitting the bumpstops will be a less predictable transition, because the operator torque needed to turn the hand wheel 114 at the bumpstops will vary depending on the driving situation.

Figure 2:
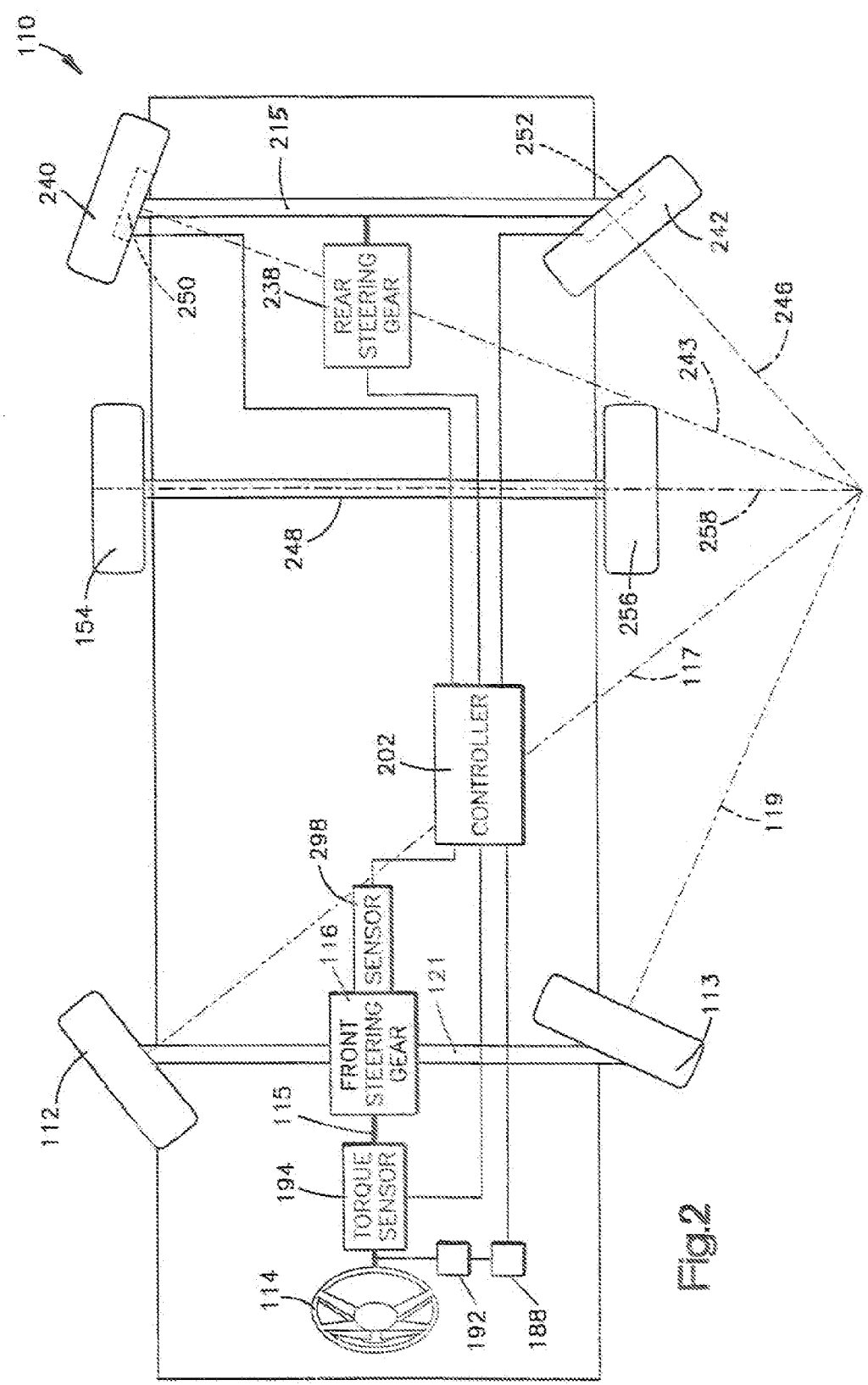
FIG. 2 is a schematic block diagram illustrating a second exemplary embodiment of a steering apparatus constructed in accordance with the present invention.

In addition to initiating operation of the rear steering gear 238, the controller 202 may also effect operation of a rear wheel brake 250 or 252 operatively connected to the controller 202. In the illustrated embodiment of the invention, the controller 202 effects operation of only the rear wheel brake 250 or 252 which is disposed on a radially inner side of a turn. For example, the controller 202 could effect operation of the rear wheel brake 252 which is disposed on a radially inner side of the turn after the front steerable wheels 112 and 113 have been turned to their end of steering range positions as shown in FIG. 2, or when both the front and rear steerable wheels 112, 113, 240, and 242 have been turned to their end of steering range positions.

From the above description of the invention, those skilled in the art will perceive improvements, changes and modifications. Such improvements, changes and modifications within the skill of the art are intended to be covered by the appended claims.

Having described the invention, we claim the following:

1. An apparatus for use in turning steerable wheels of a vehicle upon manual rotation of a hand wheel, said apparatus comprising:
   a front steering gear connected with front steerable wheels of the vehicle, said front steering gear being operable to turn the front steerable wheels of the vehicle upon manual rotation of the hand wheel;
   a rear steering gear connected with rear steerable wheels of the vehicle, said rear steering gear being operable to turn the rear steerable wheels upon manual rotation of the hand wheel;
   a sensor for sensing a parameter related to the steering of said front steerable wheels; and
   a controller which is operatively connected with said sensor and said rear steering gear, said controller being operable in response to the sensed parameter to effect operation of said rear steering gear to maintain a predetermined kinematic relationship between the front steerable wheels and the rear steerable wheels throughout a first range of turning movement of the front steerable wheels. the kinematic relationship being such that the front steerable wheels have a first angular relationship with the rear steerable wheels that remains the same throughout the first range of turning movement of the front steerable wheels,
   said controller being operable to effect of operation of said rear steering gear to oversteer the rear steerable wheels in response to an output from said sensor corresponding to at least a predetermined torque applied to the hand wheel which occurs when turning of the front steerable wheels during a second range of movement near a mechanical end of their range of turning movement.

2. The apparatus as set forth in claim 1, wherein said sensor senses at least one of a maignitude, rate, and acceleration of rotation of said hand wheel to determine the torque applied to said hand wheel.

3. The apparatus as set forth in claim 2, wherein said controller is operable to effect operation of said rear steering gear to oversteer the rear steerable wheels in response to an output from said sensor corresponding to at least a predetermined torque applied to the hand wheel which occurs when turning of the front steerable wheels during a second range of movement near a mechanical end of their range of turning movement.

4. The apparatus as set forth in claim 2, wherein said controller includes a lookup table that includes values of the torque applied to the hand wheel based on the hand wheel angle, said controller being operable to effect operation of said rear steering gear to oversteer the rear steerable wheels when the position of the hand wheel and the torque applied to the hand wheel correspond to a hand wheel position and operator torque stored in the look up table indicative of when turning of the front steerable wheels during a second range of movement approaching a mechanical end of their range of turning movement.

5. The apparatus as set forth in claim 2 including a motor operatively connected to said hand wheel and said controller, said controller being operable to effect operation of said motor to control the operator torque applied to the hand wheel, the operator torque being determined by said controller.

6. The apparatus as set forth in claim 5, wherein the operator torque is based on at least one signal indicative of a condition of the vehicle during a steering maneuver, said at least one signal being provided to said controller.

7. The apparatus as set forth in claim 5, wherein said controller is operable to effect operation of said rear steering gear to oversteer the rear steerable wheels in response to the output from said torque sensor corresponding to at least the torque which occurs when turning of the front steerable wheels during a second range of turning movement approaching a mechanical end of their range of turning movement.

8. The apparatus as set forth in claim 1, wherein the vehicle includes middle wheels located between said front and rear steerable wheels, each of said front, rear and middle wheels having a rolling axis, the predetermined kinematic relationship between said front and rear steerable wheels is such that all of the rolling axes for the wheels intersect each other at a common point throughout the first range of turning movement of the front steerable wheels.

9. The apparatus as set forth in claim 8, wherein said controller is operable to effect operation of said rear steering gear to oversteer the rear steerable wheels so that the angle between the rolling axis of one of the front steerable wheels and the rolling axis of one of the rear steerable wheels exceeds the predetermined angle in response to the output from said sensor corresponding to at least the torque which occurs when turning of the front steerable wheels during a second range of turning movement approaching a mechanical end of their range of turning movement.

10. The apparatus as set forth in claim 1, wherein the kinematic relationship is such that the turning angle of the rear steerable wheels is determined by a rotational magnitude of the hand wheel and an operator torque applied to the hand wheel.

11. An apparatus for use in turning steerable wheels of a vehicle upon manual rotation of a hand wheel, said apparatus Comprising:
a front steering gear connected with front steerable wheels of the vehicle, said front steering gear being operable to turn the front steerable wheels of the vehicle upon manual rotation of the hand wheel;
a rear steering gear connected with rear steerable wheels of the vehicle, said rear steering gear being operable to turn the rear steerable wheels upon manual rotation of the hand wheel;
a sensor for sensing a parameter related to the steering of said front steerable wheels; and
a controller which is operatively connected with said sensor and said rear steering gear, said controller being operable in response to the sensed parameter to effect operation of said rear steering gear to maintain a predetermined kinematic relationship between the front steerable wheels and the rear steerable wheels throughout a first range of turning movement of the front steerable wheels,
wherein the kinematic relationship has the following equation: $RA=K_1HA+K_2HT$, where $RA$=turning angle of the rear steerable wheels, $HA$=rotational magnitude of the hand wheel, $HT$=operator torque applied to the hand wheel, and $K_1$ and $K_2$ are constant values.

12. An apparatus for use in turning steerable vehicle wheels upon manual rotation of a hand wheel, said apparatus comprising:
a front steering gear connected with steerable front wheels of the vehicle, said front steering gear being operable to turn the steerable front wheels of the vehicle upon manual rotation of the hand wheel;
a rear steering gear connected with steerable rear wheels of the vehicle;
a torque sensor connected with the hand wheel; and
a controller which is connected with said torque sensor and rear steering gear, said controller selectively controlling said rear steering gear in response to an output from said torque sensor upon manual application of at least a predetermined torque to the hand wheel, said torque sensor having an output which corresponds to a torque which is less than the predetermined torque throughout turning of the steerable front wheels through a first range of turning movement, said torque sensor having an output which corresponds to a torque which is at least as great as the predetermined torque which occurs when turning of the steerable front wheels during a second range of turning movement of the front steerable wheels, said controller selectively controlling said rear steering gear in response to the output from said torque sensor through the first range of turning movement of the said front steerable wheels so that that steering angle of the rear steerable wheels has a first relationship to the steering angle of the front steerable wheels, said controller selectively controlling said rear steering gear in response to the output from said torque sensor through the second range of turning movement of said front steerable wheels so that the steering angle of the rear steerable wheels has a second relationship to the steering angle of the front steerable wheels different from the first relationship.

13. An apparatus as set forth in claim 12 wherein said controller is operable to effect operation of said rear steering gear through the first range of turning movement of said front steerable wheels so that the first relationship of the steering angle of the rear steerable wheels is a kinematic relationship with the steering angle of the front steerable wheels.

14. An apparatus as set forth in claim 13 wherein said controller is operable to effect operation of said rear steering gear through the second range of turning movement of the said front steerable wheels so that the second relationship of the steering angle of the rear steerable wheels is an oversteering relationship with the steering angle of the front steerable wheels.

15. An apparatus as set forth in claim 12 wherein the torque sensor has an output which is less than the predetermined torque throughout turning of the steerable front wheels through the first range of turning movement during normal operation of the front steering gear, said torque sensor having an output which corresponds to a torque which is at least as great as the predetermined torque which occurs when turning of the steerable front wheels through the second range of motion in a direction that cannot be performed, the controller being operable to effect operation of the rear steering gear in response to the output from the torque sensor corresponding to at least the torque which occurs when turning of the steerable front wheels in the direction that cannot be performed.

16. An apparatus as set forth in claim 12, wherein the controller, in response to the output from the torque sensor, effects rotation of the hand wheel to adjust a steering feel of the hand wheel, the controller selectively controlling the rear steering gear in response to the adjusted steering feel of the hand wheel so that the rear steerable wheel have the first relationship to the steering angle of the front steerable wheels through the first range of turning movement of the front steerable wheels and so that the rear steerable wheels have the second relationship to the steering angle of the front steerable wheels through the second range of turning movement of the front steerable wheels.

* * * * *